S. G. LEYSON.
ELECTRIC ANIMAL TRAP.
APPLICATION FILED DEC. 13, 1913.

1,115,695.

Patented Nov. 3, 1914.

WITNESSES:

INVENTOR.
Sackville G. Leyson.
BY
ATTORNEY.

UNITED STATES PATENT OFFICE.

SACKVILLE G. LEYSON, OF SYRACUSE, NEW YORK.

ELECTRIC ANIMAL-TRAP.

1,115,695.  Specification of Letters Patent.  Patented Nov. 3, 1914.

Application filed December 13, 1913. Serial No. 806,611.

*To all whom it may concern:*

Be it known that I, SACKVILLE G. LEYSON, a citizen of the United States, residing at Syracuse, in the county of Onondaga and State of New York, have invented certain new and useful Improvements in Electric Animal-Traps, of which the following is a specification.

This invention relates to traps, and has for its object to provide a device of the class into which rats and other animals may be lured by means of a suitable bait, then killed by means of an electric current, and finally dropped into a vat or tank containing acid which consumes the bodies of the animals. And a further object is to provide an electric animal trap suitable for installing in residences, stores, warehouses, wharves and docks, and which is capable of entrapping and destroying a large number of animals without requiring emptying, recharging or other attention or care during long intervals of time.

The various features and parts of the invention will be understood from the detailed description which follows, and by reference to the accompanying drawing, in which—

Figure 1:
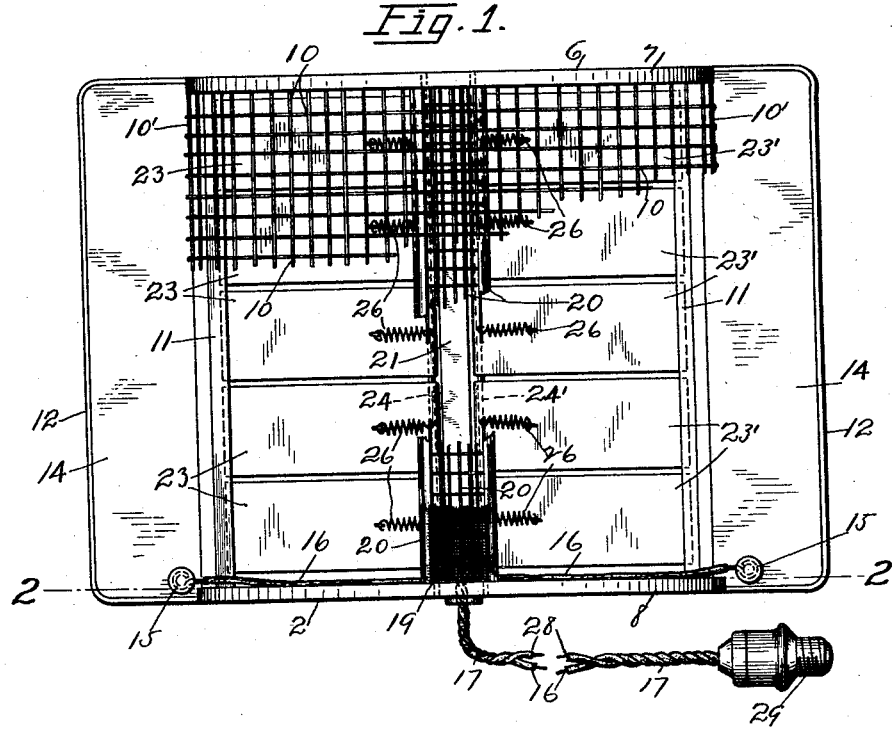
Figure 2:
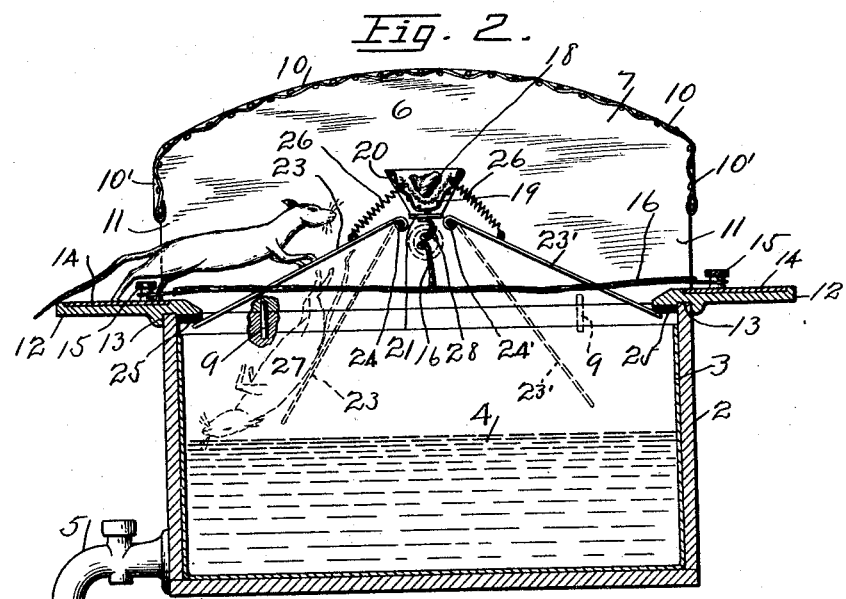

Figure 1 is a top plan view of the trap, with certain parts broken away; showing the construction and arrangement of the working parts. Fig. 2 is a vertical cross-section, taken substantially on line 2—2 of Fig. 1; showing the same in action.

Similar characters of reference are assigned to corresponding parts throughout the several views.

In the drawing, 2 represents a box or case, which may consist of wood or metal, having an open top, and within which is preferably disposed a metallic or earthen tank or liquid receptacle 3, which is preferably removable.

In the present case the tank 3 is partially filled with an acid, or corrosive agent 4, which consumes and destroys the rats or other animals, which are thrown into the tank, after being shocked or killed by the electricity. And 5 represents a cock or faucet for drawing off the liquid from the tank 3.

6 represents an arched and caged cover for the open top of the case or box 2, which comprises a wood and metal frame consisting of ends 7 and 8, which rest upon the opposite ends of the box 2, and are detachably secured thereto by dowel-pins 9. The ends 7 and 8 are connected by a relatively coarse wire fabric 10 which comprises the entire top of the trap, its opposite sides 10' over-lapping and partially inclosing the sides of the cover, as best seen in Fig. 2. The ends 7 and 8 of the cover are preferably closed, but the opposite sides are open at 11, to allow the rodents or other animals to enter the upper compartment 6 in quest of the bait.

12 represents platforms or thresholds which are disposed horizontally and project outwardly from the bottom of the openings 11, and which are detachably secured to the top side edges of the box 2, by means of downwardly facing grooves 13. (See Fig. 2.)

The top surface of each platform 12 is partially covered with a metal plate 14, which is a conductor of electricity. Each of the plates 14 is fitted with a binding-post 15, and the binding-posts are connected by a common wire 16. By this arrangement of the wire 16, the plates 14 form multiple terminals for one side of the electric circuit represented by the cable 17, which supplies current for electrocuting the animals. The bait or lure 18, is placed in the wire gauze trough 19, which is loosely disposed in a similar trough or tray 20 of coarse wire, the latter being securely mounted on a supporting-bar 21, preferably metal which extends between and is secured to the ends 7 and 8 of the top. The troughs 19 and 20 are preferably disposed centrally between and parallel to the platforms 12, but in a higher plane. The spaces between plates 14 and the bait containers 19—20 are closed and bridged by a plurality of trap-doors 23 and 23', which are hinged respectively to rods or pintles 24 and 24', the latter being supported at their opposite ends by the parts 7 and 8 of the top 6, below and parallel to the bar 21. The lower ends of the trap-doors 23 and 23' engage the insulated under edges 25 of the platforms 12 which project into the box 2. The trap-doors 23 and 23' are held in their normal position, shown by full lines in Fig. 2, by springs 26, which connect at their opposite ends to the doors, and the main trough 20. The springs 26 preferably exert only enough tension or power to normally hold the doors against the platforms 12. And are intended to allow the doors to readily yield downwardly, as shown by the dotted lines in Fig. 2, when a rat or other animal, as 27, throws its weight on the free ends of the doors, for precipitating the animal into the acid 4. The bar 21, trough 20, springs 26, and the trap doors 23 and 23' all being metal and connected are all charged with the electric current by a second wire 28, which connects to one end of the bar, and these parts therefore form the opposite terminal, or branch of the circuit. The current employed for electrocuting the animals, may be derived from any source, but I prefer to obtain the same from any common commercial lighting circuit, by means of a plug 29, which is connected to the opposite end of the cable 17. The electric circuit I employ is normally open by reason of the gap comprising the space between the lower ends of the doors and the inner edges of the terminal plates 14.

By the provision of the spaces or gaps between the lower ends of the trap-doors 23 and 23' and the inner edges of the plates 14, the electric circuit employed for killing the animals is normally open, and the only time any current is consumed is when an animal stands partly on the said plates, and partly on the said doors, as shown in Fig. 2. By this construction and arrangement a large number of animals may be trapped, electrocuted and destroyed at a very small outlay for electric current. And owing to the disposition and arrangement of the electric terminals, and the size of the openings 11, there is no danger of any person being injured by accidentally coming into contact with said parts.

My improved traps are particularly adapted for destroying rodents in the neighborhood of wharves or docks, and for this purpose the traps are made to resemble long troughs, wherein the covers may be made continuous, or made in spaced sections (not shown) disposed at frequent intervals according to desire or necessity.

After the traps have been prepared for use, the rodents climb upon the platforms 12, and enter the openings 11 in quest of the bait 18. The instant the fore-feet of an animal touch either of the trapdoors 23 or 23', it completes the circuit between the terminals 14 and the said doors. The strong electric current then instantly kills or shocks the animal, and at the same time the weight of the animal, even though a mouse or young rat, bearing upon the trap doors forces the doors downwardly, and the dead or stunned body is precipitated into the acid 4, which should be of a character suitable for entirely consuming the body. Under the construction and arrangement of the trap-doors, as herein shown and described, there is no danger of the body of the rodent being caught and held by the doors or other parts, and after the body has once been precipitated into the tank 3, there is no chance for it to escape, as the trap doors spring quickly back into the normal position shown in full lines in the drawing, in which position they substantially close the open top of the box 2. The tension of the springs 26 can be so adjusted, that even if the electricity should fail, the animals would be precipitated into the acid tank 3, and destroyed. The wire mesh 10 is not charged with the electric current and a rodent may climb over said part without being shocked. The cover 6 may be handled—removed and replaced—without danger to any one and without requiring the disconnecting of the plug 29. At suitable intervals of time the tanks 3 may be cleaned out and the supply of the acid replenished.

Having thus described my invention, what I claim as new and desire to secure by Letters Patent, is—

1. An electric rat trap, including a tank open at its top, a cover mounted on said tank having openings at its opposite sides, terminal plates mounted on platforms disposed outside of said openings, an electric wire connecting said terminal plates in series, a plurality of trap doors hinged to spaced rods carried by said cover, and declining toward said terminal plates, a bait trough disposed between said rods, and comprising an electric conductor, and springs forming the electrical connections between said trough and said doors and normally holding the lower ends of said doors against said platforms.

2. An electric trap, including a tank having an open top, a cover for said tank, a trough comprising an electrical conductor supported by said cover between and parallel to said openings, trap-doors hinged to rods disposed on the opposite sides of said trough, terminal plates mounted on platforms disposed engaging said trap-doors, springs electrically connecting said trap-doors to said trough, said springs adapted to normally hold the free ends of said trapdoors close to said terminal plates, an electric wire connecting said terminal plates, and an electric wire connected to said trough.

3. In an electric trap, the combination of a tank open at its top, a cover mounted on top of said tank, having openings at its opposite sides, platforms projecting outwardly from said openings, terminal plates mounted on said platforms and extending into said openings, said plates connected in series by an electric wire, a bait trough disposed midway between said openings, an electric wire connecting to said trough, a plurality of trap doors hinged at the opposite sides of said trough, said doors arranged side by side and capable of independent movement, and springs for holding the lower ends of said doors against said platforms, said springs conducting the electricity from the trough to said doors.

4. In an electric rat trap, the combination of a tank open at its top, a caged cover mounted on said tank having openings at its opposite sides, terminal plates mounted on platforms disposed in said openings, an electric wire connecting said terminal plates, a plurality of trap-doors pivoted on rods carried by said cover parallel to said plates and said openings, said doors declining from said rods toward said platforms, a bait trough supported by said cover above and parallel to said rods, an electric wire connected to said trough, and a series of springs forming the electrical connections between said trough and each of said doors, said springs adapted to normally hold the lower ends of said doors against said platforms.

5. The combination of a tank open at its top, thresholds mounted on the opposite top-edges of the tank, electric terminal plates supported by said thresholds, said plates connected in series, trap-doors pivoted between said thresholds and declining toward and contacting with said thresholds, a metal bait trough disposed between the pivoted ends of said trap doors, said trough comprising an electric conductor, and a series of springs forming the electrical connection between said trough and each of said trap-doors and normally holding the free ends of said trap-doors against said thresholds.

In testimony whereof I affix my signature in presence of two witnesses.

SACKVILLE G. LEYSON.

Witnesses:
 HOWARD V. RULISON,
 FRANK GARDEN.

---

Copies of this patent may be obtained for five cents each, by addressing the "Commissioner of Patents, Washington, D. C."